Figure 1:
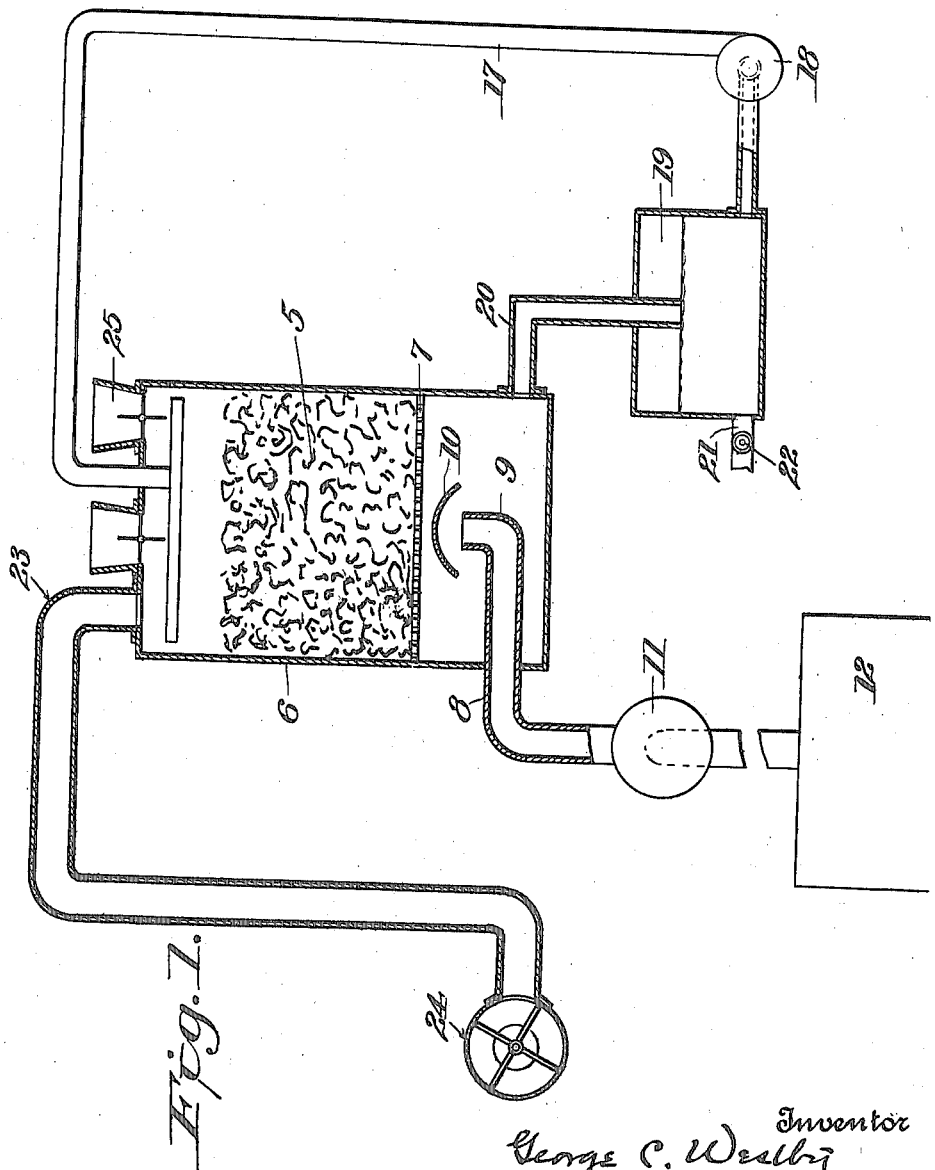

G. C. WESTBY.
PROCESS AND APPARATUS FOR UTILIZING SULFUROUS GASES WITH TREATMENT OF METALLIFEROUS MATERIALS.
APPLICATION FILED APR. 10, 1917.

1,266,731.

Patented May 21, 1918.
2 SHEETS—SHEET 1.

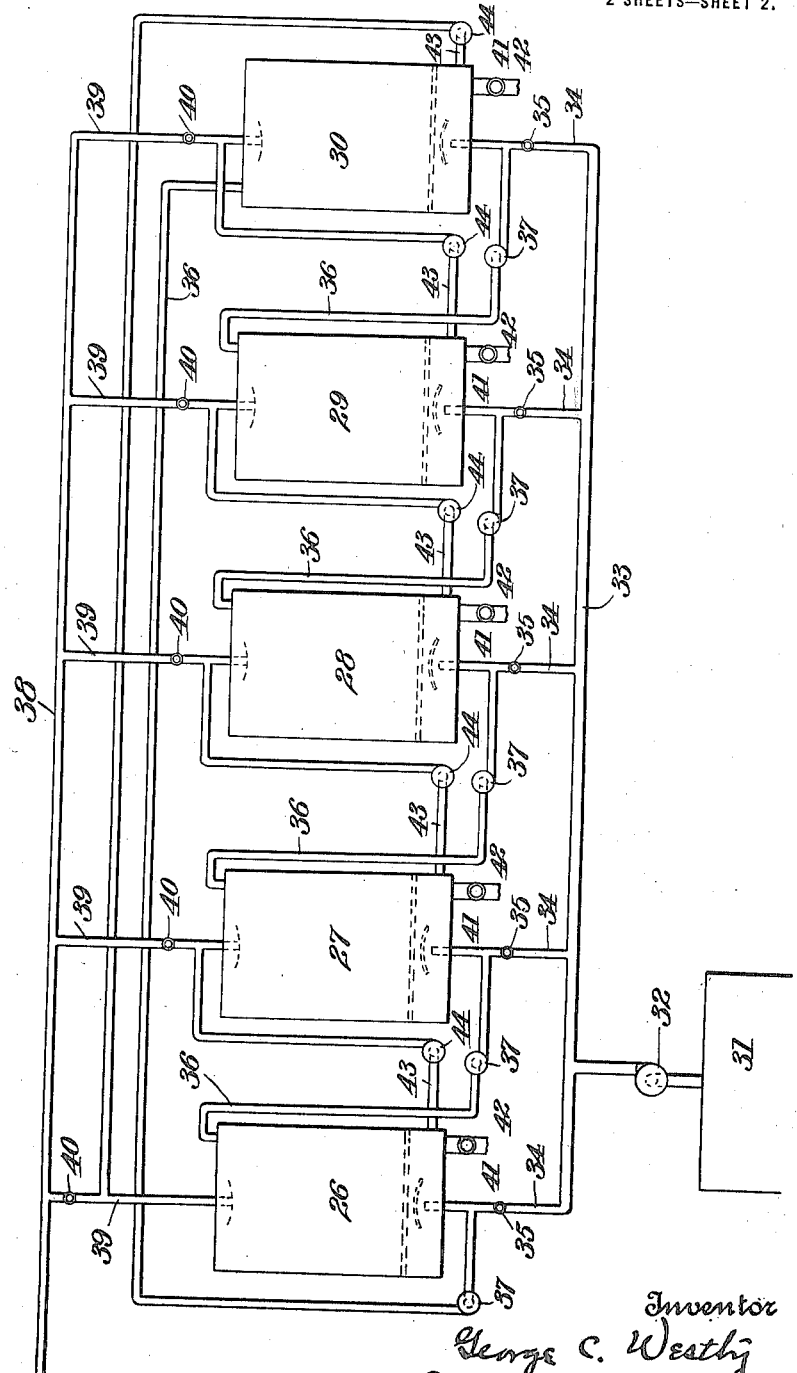

UNITED STATES PATENT OFFICE.

GEORGE C. WESTBY, OF LUDWIG, NEVADA, ASSIGNOR TO WESTERN PROCESS COMPANY, A CORPORATION OF MAINE.

PROCESS AND APPARATUS FOR UTILIZING SULFUROUS GASES WITH TREATMENT OF METALLIFEROUS MATERIALS.

1,266,731.      Specification of Letters Patent.      Patented May 21, 1918.

Application filed April 10, 1917. Serial No. 160,933.

*To all whom it may concern:*

Be it known that I, GEORGE C. WESTBY, a citizen of the United States, residing at Ludwig, in the county of Lyon and State of Nevada, have invented certain new and useful Improvements in Processes and Apparatus for Utilizing Sulfurous Gases with Treatment of Metalliferous Materials, of which the following is a full, clear, and exact specification.

My invention relates to processes and to apparatus for effecting the sulfatization of metalliferous materials, such as the ores of copper, zinc, manganese and the like, wherein I utilize as an active reagent the highly sulfurous gases such as those arising from smelter furnaces, and the like. Its objects are to effect such a sulfatizing of the ores rapidly, efficiently and economically to simultaneously remove the metal values therefrom, and to utilize substantially the entire sulfurous gas content of the gases employed. Further objects of my invention will hereinafter appear.

In carrying out my invention I effect simultaneously a sulfatizing of the metal values in the ore by means of the sulfurous gases employed and a leaching out of the said values in the dissolved state. From the solution obtained by leaching I may precipitate the metal values in any suitable manner.

In treating ore in accordance with my process I form a column thereof in an inclosed space wherein it is subjected to treatment. In using coarse ore I first separate therefrom the fine particles which would close up the interstices between the ore lumps or pieces.

Through the column of ore I then pass sulfurous gases while the ore is simultaneously wetted and leached by an aqueous non-alkaline liquid. The liquid thus used may be water or it may be the solution derived from the previous treatment of ore in the same manner. In general I cause the liquid and gases to travel in countercurrent, the gas being forced through the column from below by pressure or by suction and the liquid is sprayed down upon the column from the top. The reaction taking place causes the liquid to become heated, its temperature however being below the boiling point of water. The liquid drains into any suitable sump tank, from which it may be returned to the top of the column, used on a fresh body of ore, or discharged to the precipitation system.

The sulfurous gases, after having been forced or aspirated through the body of ore, may be passed through other bodies of ore undergoing similar treatment until their sulfurous constitutents are practically entirely removed and the gases may be allowed to pass off freely.

The formation of sulfites is substantially prevented by the use of oxygen, air or other oxidizing agents which are forced through the reacting mass together with the sulfurous reagent or intermittently. Where the sulfurous gases used are derived from smelter furnaces or the like, I find that the use of additional air is unnecessary, as excess air is contained therein.

In the accompanying drawings I have illustrated in a somewhat diagrammatical manner the carrying out of my invention. In them Figure 1 illustrates the process as applied to the treatment of a single body of ore, and Fig. 2 illustrates the process as applied to a series of bodies of ore.

Referring to Fig. 1, the ore 5, in coarse lumps, free from fine particles, and which may be, for example, a roasted copper ore or other similar ore is charged into a tower 6, in which it rests supported above the bottom on any suitable filter or perforated bottom 7. A gas inlet pipe 8 leads into the space 9 below the filter bottom 7, and is provided with a suitable distributer 10. This inlet pipe leads from a blower 11, which forces the sulfurous gases, in the case illustrated derived from a smelter furnace 12, and which run into the tower 6 and through the ore body.

Simultaneously with the introduction of the gas the liquid is introduced at the top through a suitable spray 13, by means of pipe 17 and pump 18 from the sump tank 19 into which the liquid flowing through the ore is drawn through the pipe 20 from the space 9 below the body of ore. The sump tank is provided with a suitable discharge 21 provided with a valve 22.

The gas introduced, after passing through the body of the ore, passes out through outlet pipe 23 to be forced through a further body of ore by means of blower 24, or it passes off into the atmosphere.

The tower is filled with ore through suitable gas tight hoppers 25 or other suitable means, and is discharged in any suitable manner (not shown).

The rate of flow of the liquid passing through the body of ore is regulated in such manner that the interstices therein are not blocked to the comparatively free passage of the gas.

In Fig. 2 is illustrated the application of the process to a series of ore bodies. A plurality of ore containing towers 26, 27, 28, 29 and 30 are supplied with sulfurous gas from a furnace 31 by means of blower 32, main 33 and the individual pipes 34 leading to the towers, each of the latter being provided with a cut off valve 35. From the top of each tower a gas outlet 36 passes to a connection 37, which may discharge the gas to the atmosphere or force it to pass into the next tower at the bottom.

Liquid is supplied to each tank from a main 38, which feeds the individual tanks through pipes 39 each provided with a cutoff valve 40. At the bottom of each tank is a discharge pipe 41 provided with a valve 42, and also an additional discharge pipe 43 through which the liquid may be drawn by pump 44 and forced to the top of the next tank, where connection is made to the liquid inlet pipe thereto.

The towers may be charged and discharged in any suitable manner.

It is apparent that by means of the connections described gas or liquid may be introduced into any one of the towers at will and caused to circulate successively through the entire series. In this manner the sulfurous constituents of the gas are efficiently and completely absorbed, leaving it in such condition that it may be permitted to pass off into the atmosphere without deleterious results.

By successively charging the towers with fresh ore and causing the liquid and gaseous reagents to pass successively through the system from the more exhausted to the less exhausted ore, I effect an efficient and economical sulfatization and leaching of the ore. I withdraw the liquid when it has reached the concentration of metal values desired and pass it into any suitable system for the extraction of the metal values therefrom.

Having thus described my invention what I claim as new and desire to secure by Letters Patent is:

1. In the process for utilizing sulfurous gases for the treatment of metalliferous ores, consisting in first removing fine particles from the ore, then charging the ore to a closed tower, then subjecting the ore to the action of sulfurous gases while simultaneously spraying the top of the ore column with a non-alkaline liquor in such quantity as not to fill the interspaces of the ore and prevent the passage of the gases, thus leaching the soluble values from the ore and abstracting the sulfurous constituents from the gases.

2. In the process for utilizing sulfurous gases for the treatment of metalliferous ores, consisting in first removing fine particles from the ore, then charging the ore to a plurality of closed towers, then subjecting the ore to the action of the sulfurous gases by passing the gases through the series of ore columns, simultaneously spraying the top of each column with a non-alkaline liquor thereby leaching the soluble values from the ore and abstracting the sulfurous constitutents from the gases.

3. In apparatus for subjecting ore to the action of sulfurous gases, a plurality of towers, filter bottoms in each of said towers for supporting the ore therein, gas inlets in said towers below the filter bottoms, water distributers near the top of the towers, means for supplying water to any one of the distributers at will, means for supplying gas to any one of the distributers at will, and means for forcing the gas and liquid successively through the towers and for discharging them.

GEORGE C. WESTBY.